United States Patent
Bray et al.

(10) Patent No.: US 10,185,614 B2
(45) Date of Patent: *Jan. 22, 2019

(54) GENERIC ALARM CORRELATION BY MEANS OF NORMALIZED ALARM CODES

(71) Applicant: International Business Machines Corporation, Armonk, NY (US)

(72) Inventors: Zane C. Bray, London (GB); Willem A. Harthoorn, Horsham (GB)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/191,571

(22) Filed: Jun. 24, 2016

(65) Prior Publication Data

US 2017/0168884 A1    Jun. 15, 2017

Related U.S. Application Data

(63) Continuation of application No. 14/964,738, filed on Dec. 10, 2015, now Pat. No. 9,417,949.

(51) Int. Cl.
  *G06F 11/07* (2006.01)
  *G06F 11/30* (2006.01)
  *H04L 12/24* (2006.01)

(52) U.S. Cl.
  CPC ........ *G06F 11/079* (2013.01); *G06F 11/0709* (2013.01); *G06F 11/0751* (2013.01);
  (Continued)

(58) Field of Classification Search
  None
  See application file for complete search history.

(56) References Cited

U.S. PATENT DOCUMENTS 7,016,312 B1    3/2006  Semaan et al.
7,039,953 B2    5/2006  Black et al.
(Continued)

FOREIGN PATENT DOCUMENTS

EP    1460801 B1    6/2006
EP    2629453 B1    8/2014
(Continued)

OTHER PUBLICATIONS

Kim, et al.; "An Alarm Correlation Algorithm for Network Management Based on Root Cause Analysis"; ISBN 978-89-5519-154-7; Feb. 13-16, 2011 ICACT2011; pp. 1233-1238.
(Continued)

*Primary Examiner* — Yolanda L Wilson
(74) *Attorney, Agent, or Firm* — Alexis N. Hatzis (57) ABSTRACT

In an approach for identifying an incident requiring action, a processor receives a plurality of notifications from a plurality of sensors, wherein each notification is related to a problem identified by a sensor of the plurality of sensors. A processor determines an event type corresponding to each of the plurality of notifications based on a type of sensor from which a respective notification originates. A processor creates a group of notifications based on a location from which each respective notification originated and a time period during which each respective notification originated. A processor calculates a weight for each notification of the group based on the corresponding event type, wherein the weight indicates a likelihood to cause other notifications. A processor issues an incident report that includes a maintenance ticket, wherein the maintenance ticket identifies a notification within the group of a higher weight than other notifications of the group.

20 Claims, 6 Drawing Sheets

(52) U.S. Cl.
CPC ...... *G06F 11/0772* (2013.01); *G06F 11/3006* (2013.01); *G06F 11/3082* (2013.01); *H04L 41/064* (2013.01); *H04L 41/065* (2013.01); *G06F 2201/86* (2013.01)

(56) References Cited

U.S. PATENT DOCUMENTS

| | | |
|---|---|---|
| 8,060,782 B2 | 11/2011 | Caspi et al. |
| 8,219,512 B2 | 7/2012 | Daily et al. |
| 8,307,374 B2 | 11/2012 | Rosenbluth et al. |
| 8,464,279 B2 | 6/2013 | Gutjahr et al. |
| 8,560,668 B2 | 10/2013 | Ceruti et al. |
| 8,615,803 B2 | 12/2013 | Dacier et al. |
| 8,700,761 B2 | 4/2014 | Bajpay et al. |
| 9,417,949 B1 | 8/2016 | Bray et al. |
| 2003/0056140 A1 | 3/2003 | Taylor et al. |
| 2004/0049365 A1 | 3/2004 | Keller et al. |
| 2004/0049565 A1 | 3/2004 | Keller et al. |
| 2008/0307269 A1* | 12/2008 | Bennett ................. G06F 11/079 714/47.2 |
| 2010/0050023 A1 | 2/2010 | Scarpelli et al. |
| 2010/0109860 A1 | 5/2010 | Williamson et al. |
| 2010/0157812 A1 | 6/2010 | Blocker et al. |
| 2013/0283088 A1 | 10/2013 | Behrendt et al. |
| 2015/0006459 A1 | 1/2015 | Lv |
| 2015/0033086 A1 | 1/2015 | Sasturkar et al. |
| 2015/0332147 A1* | 11/2015 | Anastas ................. G06N 7/005 706/12 |

FOREIGN PATENT DOCUMENTS

| | | |
|---|---|---|
| WO | 2013189753 A1 | 12/2013 |
| WO | 2010139146 A1 | 5/2014 |
| WO | 2014065804 A1 | 5/2014 |
| WO | 2014142791 A1 | 9/2014 |

OTHER PUBLICATIONS

Grace Period Disclosure: Bray, et al., "One Ticket Incident Equals One Ticket", IBM, Interconnect 2015, The Premier Cloud & Mobile Conference, Feb. 22-26, © 2015 IBM Corporation.

U.S. Appl. No. 14/964,738, filed Dec. 10, 2015; Entitled "Generic Alarm Correlation by Means of Normalized Alarm Codes".

ISO/IEC, "Information Technology—Open Systems Interconnection—Basic Reference Model: The Basic Model," International Standard, Jun. 15, 1996, p. 1-59, Second Edition, ISO/IEC 7498-1:1994, ISO/IEC Information Technology Task Force (ITTF).

* cited by examiner

| SENSOR # | LOCATION | TICKET NUMBER | EVENT TYPE |
|---|---|---|---|
| 142 | SITE LOCATION 140 | | CONNECTION LOST |
| 146 | SITE LOCATION 140 | 1152 | DEVICE FAILURE |
| 156 | SITE LOCATION 150 | | PERFORMANCE WARNING |
| 144 | SITE LOCATION 140 | | PERFORMANCE WARNING |
| 166 | SITE LOCATION 160 | 1164 | DEVICE FAILURE |
| 148 | SITE LOCATION 140 | | PERFORMANCE WARNING |
| 158 | SITE LOCATION 150 | | CONNECTION LOST |
| 152 | SITE LOCATION 150 | 1203 | SHUT DOWN / LOSS OF POWER |
| 162 | SITE LOCATION 160 | | INFORMATION EVENT |

FIG. 4

| | SENSOR # | SCOPE ID | TICKET NUMBER | EVENT TYPE | CAUSE WEIGHT | IMPACT WEIGHT |
|---|---|---|---|---|---|---|
| v | 146 | 140-814 | 1152 | DEVICE FAILURE | 300 | 30 |
| ʌ | 142 | 140-814 | 1152 | CONNECTION LOST | 100 | 80 |
| ʌ | 148 | 140-814 | 1152 | PERFORMANCE WARNING | 80 | 20 |
| ʌ | 144 | 140-814 | 1152 | PERFORMANCE WARNING | 20 | 160 |
| v | 152 | 150-902 | 1203 | SHUT DOWN / LOSS OF POWER | 400 | 40 |
| ʌ | 156 | 150-902 | 1203 | PERFORMANCE WARNING | 100 | 80 |
| ʌ | 158 | 150-902 | 1203 | CONNECTION LOST | 40 | 70 |
| v | 166 | 160-847 | 1164 | DEVICE FAILURE | 400 | 40 |
| ʌ | 162 | 160-847 | 1164 | INFORMATION EVENT | 0 | 200 |

GENERIC ALARM CORRELATION BY MEANS OF NORMALIZED ALARM CODES

STATEMENT ON PRIOR DISCLOSURES BY AN INVENTOR

The following disclosure(s) are submitted under 35 U.S.C. 102(b)(1)(A) as prior disclosures by, or on behalf of, a sole inventor of the present application or a joint inventor of the present application:

(i) BRAY, et al. "One Incident Equals One Ticket"; InterConnect 2015: The Premier Cloud & Mobile Conference; Feb. 22-26, 2015; Pages 1-22.

BACKGROUND OF THE INVENTION

The present invention relates generally to the field of alarm management and more particularly to determining the root cause of one or more alarms within a system.

It is important for many modern systems such as data centers or telecommunications systems to be able to detect and report problems which occur during the course of operation. Due to the size and complexity of large telecommunication systems, many different types of problems can occur. For example, hardware issues such as power failures, overheating, or device failures can result in operational errors such as decreased performance, dropped data packets, or a component on a network becoming unreachable. Generally, an operator is tasked with determining which problems are the result of other problems, and which problems are the root cause which must be addressed.

Modern network equipment and smart infrastructure devices are increasingly designed to generate large numbers of alarms and events which represent problems within the system. As a result, operators can be presented with thousands of alarms an hour which they need to sort into maintenance tickets that can be dealt with by maintenance teams.

SUMMARY

Aspects of an embodiment of the present invention disclose a method, computer program product, and computing system for identifying a first incident requiring action from a plurality of notifications received from one or more sensors. A processor receives a plurality of notifications from a plurality of sensors, wherein each notification of the plurality of notifications is related to a problem identified by a sensor of the plurality of sensors. A processor determines an event type corresponding to each of the plurality of notifications based on a type of sensor of the plurality of sensors from which a respective notification originates. A processor creates a group of notifications based on information indicating a location from which each respective notification originated and a time period during which each respective notification originated, wherein the group of notifications comprises one or more of the plurality of notifications. A processor calculates a first type of weight for each notification of the group of notifications based on, at least, the corresponding event type, wherein the first type of weight indicates a likelihood to cause other notifications. A processor issues an incident report, wherein the incident report includes a maintenance ticket, wherein the maintenance ticket identifies a notification within the group of notifications of a higher first type of weight than other notifications of the group of notifications.

DETAILED DESCRIPTION

In general, embodiments of the present invention provide a method, computer program product, and computer system for determining the root cause of one or more alarms in a system of networked sensors. An event management program automatically collects and analyzes data from one or more sensors included within the system of networked sensors and determines the root cause of any issues which are present.

In general, it is inexpensive to take measurements of a system and generate notifications or alerts which identify occasions where a system is not operating correctly. However, creating tickets and having a service technician repair issues with the system and close related tickets is very expensive. In general, it is a desired aspect of embodiments of the invention to reduce the number of tickets which are generated as a result of issues within a system. Often, a single issue or failure of a component results in a number of alerts being generated for other issues which are the result of a single event. For example, the loss of power to a server which hosts a website may result in a first event notification for the loss of power to the server as well as a second event notification for the website hosted on the server becoming unreachable. In some cases, a separate maintenance ticket is created for both the loss of power to the server and the hosted website becoming unreachable. Embodiments of the present invention are capable of identifying both of the event notifications as originating within the same physical area and/or within the same time period, and creating only a single ticket which is linked to both event notifications.

In general, a purpose of embodiments of the present invention is to minimize the number of alarms and events network operators and system administrators have to action. In many embodiments this will seek to reduce the number of maintenance tickets created while still creating a ticket for each incident or issue identified by the event notifications received as requiring engineering attention. Additionally, embodiments of the present invention allow the root cause of an issue which results in multiple event notifications to be more easily identified.

Figure 1:
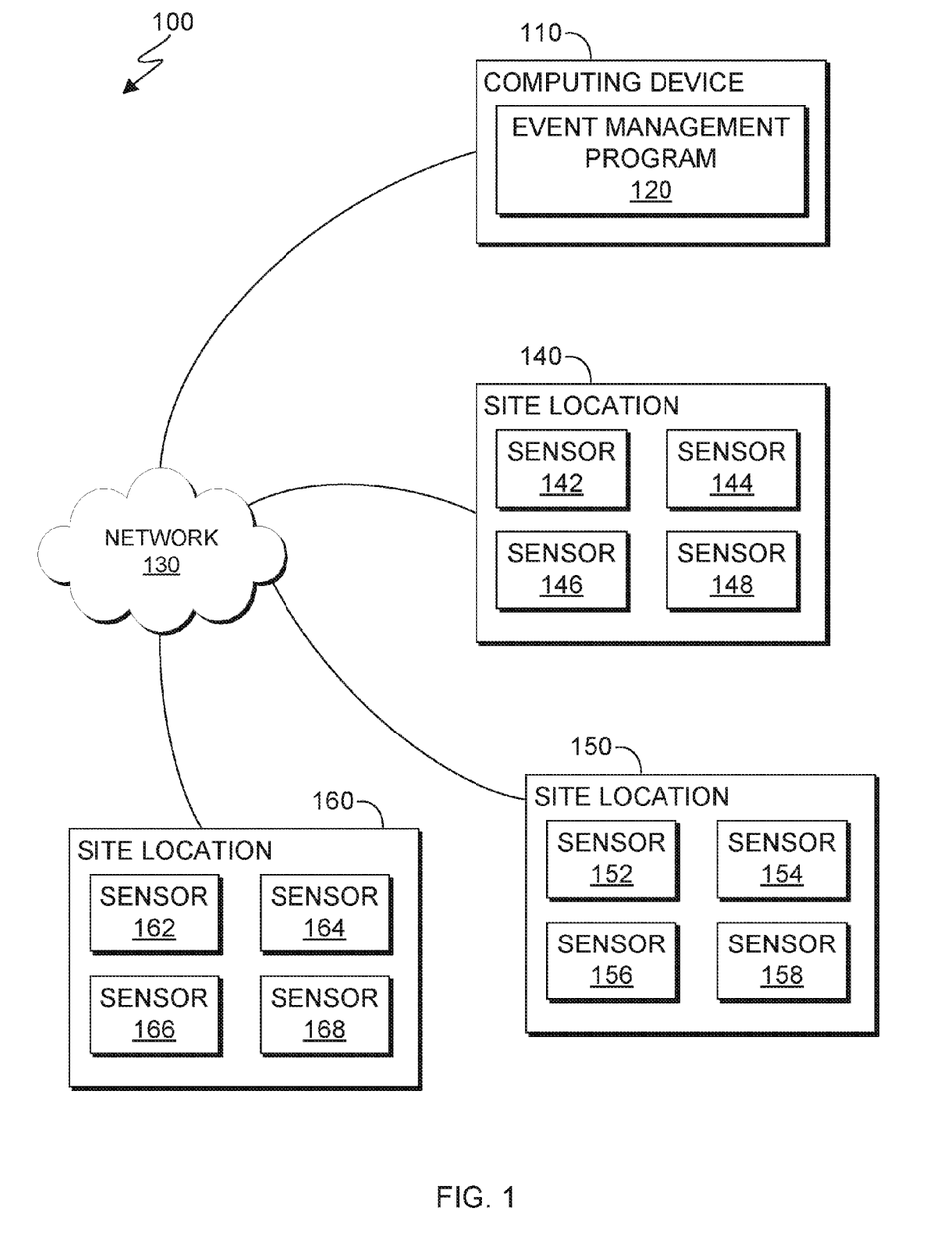
FIG. 1 is a functional block diagram illustrating a networked monitoring environment including a computing device and three site locations including sensors, in accordance with an embodiment of the invention.

The present invention will now be described in detail with reference to the Figures. FIG. 1 is a functional block diagram illustrating a networked monitoring environment, generally designated 100, in accordance with one embodiment of the present invention. In the depicted embodiment, networked monitoring environment 100 includes computing device 110, network 130, and site locations 140, 150, and 160. Further, in the depicted embodiment, computing device 110 includes event management program 120. Site location 140 includes sensors 142-148. Site location 150 includes sensors 152-158. Site location 160 includes sensors 162-168. It should be noted that in various embodiments of the present invention, any number of site locations and sensors may be present. In addition, each site location may include the same, or a different number of sensors.

In various embodiments of the present invention, computing device 110 can be a server, laptop computer, tablet computer, netbook computer, personal computer (PC), or desktop computer. In another embodiment, computing device 110 represents a computing system utilizing clustered computers and components to act as a single pool of seamless resources. In general, computing device 110 can be any computing device or a combination of devices with access to event management program 120 and network 130 and is capable of processing program instructions and executing event management program 120, in accordance with an embodiment of the present invention. Computing device 110 may include internal and external hardware components, as depicted and described in further detail with respect to FIG. 6.

Event management program 120 is a computer program which receives information from the one or more sensors (e.g., sensors 142-148, 152-158, and 162-168) included in networked monitoring environment 100 and determines which sensor identifies an issue which is most likely to be the root cause of one or more issues identified by the one or more sensors. In many embodiments, each sensor that transmits information to event management program 120 is designed to identify a specific issue to event management program 120 which is meant to be limited or avoided within networked monitoring environment 100. For example, in one embodiment, a first sensor is designed to identify whether power is currently supplied to a component within networked monitoring environment 100 while a second sensor may be designed to identify whether the same component within networked monitoring environment 100 is currently performing within an acceptable range. A component may be, for example, a computing device, a component of a computing device, or another type of device monitored by one or more sensors (e.g., sensors 142-148, 152-158, 162-168). In this embodiment, the loss of power to the component may result in the component performing below its acceptable range. In this embodiment, event management program 120 determines that both events occurred within the same area and at the same time, and as a result determines that the loss of power to the component is the root cause of the lower performance of the component.

Figure 2:
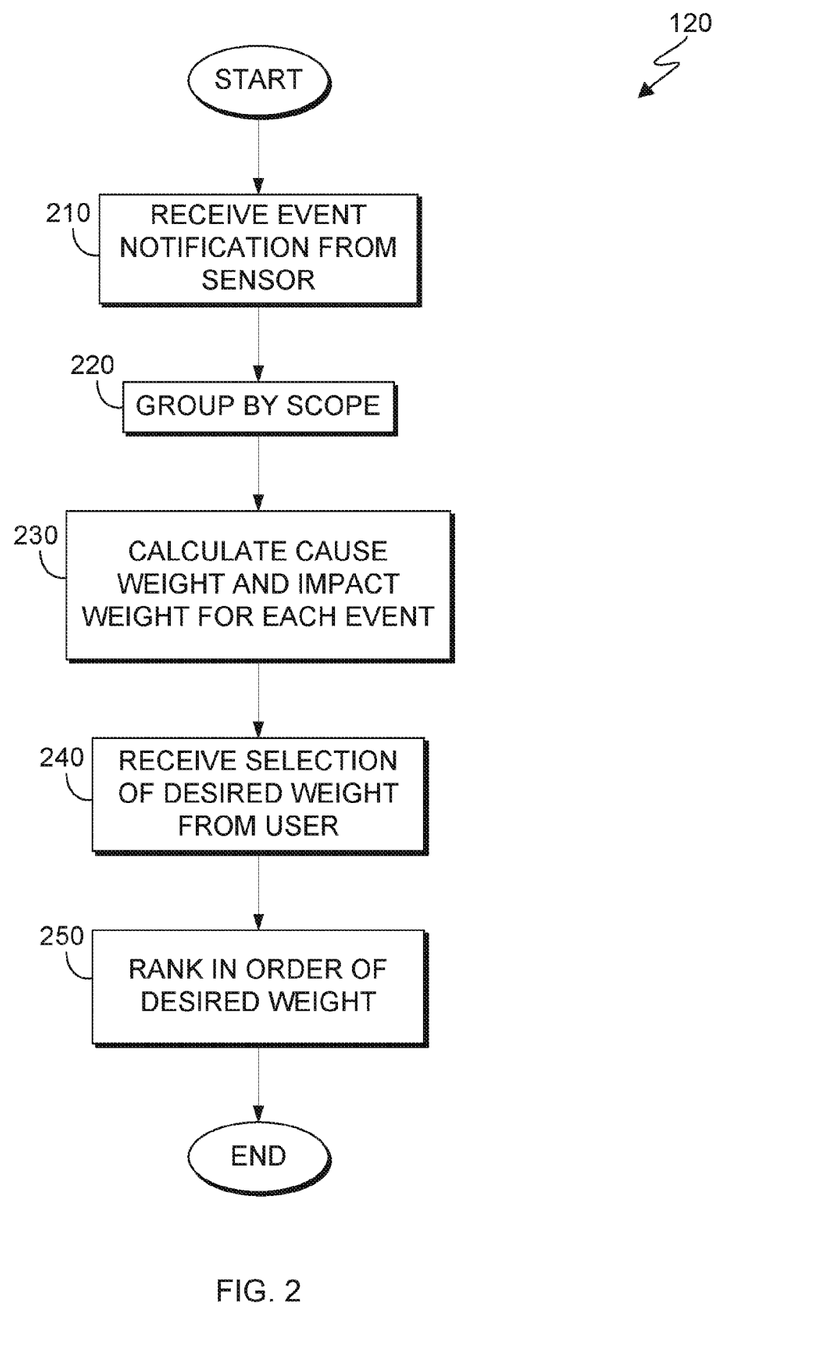
FIG. 2 is a flowchart depicting the operational steps included in an event management program included in the computing device of FIG. 1, for determining which sensor identifies an issue which is most likely to be the root cause of one or more issues identified by one or more of the sensors within the networked monitoring environment.

The functionality of event management program 120 is depicted and described in greater detail with respect to FIG. 2.

In the depicted embodiment, event management program 120 is located on computing device 110. However, in other embodiments, event management program 120 may be located externally and accessed through a communication network such as network 130. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 110, event management program 120 and sensors 142-148, 152-158, and 162-168, in accordance with a desired embodiment of the invention. Protocols may include, but are not limited to, Simple Network Management Protocol (SNMP), Common Object Request Broker Architecture (CORBA), Open Platform Communications (OPC), $3^{rd}$ Generation Partnership Project (3GPP), etc., or may be structured or unstructured text, including but not be limited to Extensible Markup Language (XML), JavaScript Object Notation (JSON), comma and tab delimited American Standard Code for Information Interchange (ASCII) text, etc.

Site locations 140, 150, and 160 are physical locations or regions within one or more physical locations which are interconnected such that an event which occurs within a site location can lead to one or more other events occurring within the same site location. For example, if an air conditioning unit fails within site location 150 of FIG. 1, then it is likely that an increase in temperature will be detected by other sensors within site location 150, but it is not likely that an increase in temperature will be detected by any of the sensors within site location 160. In another embodiment, site locations divide different areas or separate systems which are present within the same physical location.

In various embodiments of the invention, site locations can be data centers, manufacturing facilities, portions of infrastructure such as cellular towers, office buildings, or any other location or collection of components which is maintained by an organization to perform a desired function. It should be appreciated that the types of sensors which are included within a site location is determined based on the functionality of the site location and the specific components which are included within the site location.

Additionally, it should be appreciated by one skilled in the art that each site location includes networking systems which facilitate each of the sensors included within the site location to communicate with network 130.

Further, site locations can be different locations within the same physical site, such as an office building which also includes a data center in the same building. In that embodiment, the office portion of the building and the data center would be two different site locations. In addition, it should be noted that, in some embodiments, site locations 140, 150, and 160 are logical locations rather than physical locations.

In one embodiment, sensors 142, 144, 146, 148, 152, 154, 156, 158, 162, 164, 166, and 168 are physical devices which are configured to collect information related to the properties or operation of a component within a site location within networked monitoring environment 100. While sensors can be configured to collect information related to any aspect of a component, some examples of sensors include temperature sensors, power supply sensors, air flow sensors, cabinet door sensors, etc.

In some embodiments, a sensor may be a portion of software which is configured to collect digital information from another software component and send a status message to event management program 120 at regular intervals.

In other embodiments, sensors may be portions of software which are configured to send information related to a process or the status of a component to event management program 120.

FIG. 2 is a flowchart depicting the operational steps included in event management program 120 for determining which sensor identifies an issue which is most likely to be the root cause of one or more issues identified by one or more of the sensors within networked monitoring environment 100.

In step 210, event management program 120 receives an event notification from one or more of the sensors included in networked monitoring environment 100, in accordance with an embodiment of the invention. In the depicted embodiment, event management program 120 receives data from each of the sensors 142-148, 152-158, and 162-168 included within networked monitoring environment 100. In one embodiment, an event notification is an indication that a process or attribute of a component which is monitored by the sensor is not within an acceptable range. In various embodiments, an event notification can include information such as the location of the sensor which created the event notification or the time at which the event notification was created.

For example, in one embodiment, networked monitoring environment 100 includes a first sensor which is used to measure the number of transactions processed per minute by a computing device used by, for example, a bank. In this embodiment, a second sensor is used to measure the current temperature of the computing device and a third sensor is used to measure the operation of a fan within the computing device. In on example, a decrease in the performance of the fan within the computing device may be identified by the first sensor, while an increase in the temperature of the computing device may be identified by the second sensor, and a decrease in the number of transactions processed per minute may be identified by the third sensor. In one embodiment, each event notification includes a scope identification (ID), associated with the event notification, which describes the physical location and time of origin of the event notification.

In step 220, event management program 120 groups the event notifications received in step 210 based on the scope IDs of the received event notifications. In general, the scope ID is a portion of information which describes the physical location and time of origin of the event notification. For example, in one embodiment, two event notifications which originate from site location 160 at 11:42 a.m. are grouped into a first group, while a third event notification which originates from site location 140 at 10:38 a.m. is grouped into a second group. In other embodiments, event notifications are grouped based on pre-defined regions within each site location such as a data center for a specific network or an office.

In step 230, event management program 120 calculates the cause weight and impact weight for each event received in step 210. In general, the process of calculating the cause weight and impact weight for an event includes identifying a generic event class of which the current event notification is a member. Once the generic event class of an event notification is determined, a cause factor and an impact factor are determined. In general, the cause factor and impact factor are values which are used in the calculation of the cause weight and impact weight. The cause factor and impact factor represent the relative chance of an event being the cause of other events or impacting an end user, respectively, relative to other types of events. For example, a cause factor corresponding to an event notification for a loss of power may have a value of 80, while a cause factor corresponding to an event notification for a high temperature may have a value of 20, based on the fact that a loss of power is more likely to be the cause of other issues or events than a high temperature. Once the cause factor and impact factor are determined for an event notification they can be weighted according to their place in the system topology. In some embodiments, events relating to environment and physical hardware are weighted higher than events relating to networking and communications which in turn are weighted higher than events relating to end user applications, because while a hardware failure will cause an application to crash the reverse is not true. Open Systems Interconnection (OSI) is a conceptual model that characterizes and standardizes communication functions of a telecommunication or computing system without regard to underlying internal structure and technology. Typically, a layer serves the layer above it and is served by the layer below it. OSI layers include, a physical layer, a data-link layer, a network layer, a transport layer, a session layer, a presentation layer, and an application layer. In some embodiments, the level of the Open Systems Interconnection (OSI) stack from which the event notification originates is used to determine a specific formula for calculating the cause weight and impact weight of the event notification, based on the cause factor and the impact factor for the event notification, in non-IT domains a similar hierarchy may be defined.

A generic event class is a broad category of the types of event notifications that can be produced by the sensors included within networked monitoring environment 100. In one embodiment where sensors are used to monitor the operation of a data center, different generic event classes can include, for example, high temperature warnings, performance warnings, power loss warnings, physical shutdowns, operational status notifications, component failure warnings, connection loss warnings, or other informational events. In other embodiments, other generic event classes can be used based on the details of the embodiment and the types of sensors included within networked monitoring environment 100. It should be appreciated that the examples of generic event classes depicted in FIG. 3 and described herein are intended to describe one embodiment of the invention for illustrative purposes, and are not meant to be limiting.

A cause factor is a value which represents the likelihood that a given event indicated by an event notification is the cause of one or more other events (which may or may not be indicated by other event notifications). In a preferred embodiment, each of the generic event classes are ranked by a user from most likely to be the cause of other events to least likely to be the cause of other events. Once the generic event classes are ranked, a cause factor is assigned to each of the generic event classes, where a generic event class which is ranked more likely to be the cause of other events is given a higher cause factor, and a generic event class which is ranked as less likely to be the cause of other events is given the lower cause factor. In general, it is desirable to rank the generic event classes instead of assigning each generic event class a cause factor independently, in order to avoid ties or situations where two generic event classes are given the same cause factor.

Similar to a cause factor, an impact factor is a value which represents the likelihood that a given event indicated by an event notification has an effect on the operation of the process or functionality which networked monitoring environment 100 is intended to monitor. For example, in an embodiment where networked monitoring environment 100 is used to monitor infrastructure which supports a cellular network, the impact factor for a given event notification represents the likelihood that the event indicated by the event notification will interfere with the cellular or telecommunications services provided to users of the cellular network. In another embodiment where networked monitoring environment 100 is used to monitor infrastructure within a data center which hosts a website, the impact factor for a given event notification represent the likelihood that the event will cause the website hosted by the data center to become unreachable, or for the event to interfere with a user's ability to use the website. While it might appear as though a high cause event such as power loss might also have a high impact weighting on users, this may not be the case. The power loss itself is invisible may be to end users, and because of, for example, a battery back-up, the power loss may not have an impact on users. However, the non-availability of a web service that has failed because of that power loss is not invisible to a user and thus has a greater impact weighting.

Figure 3:
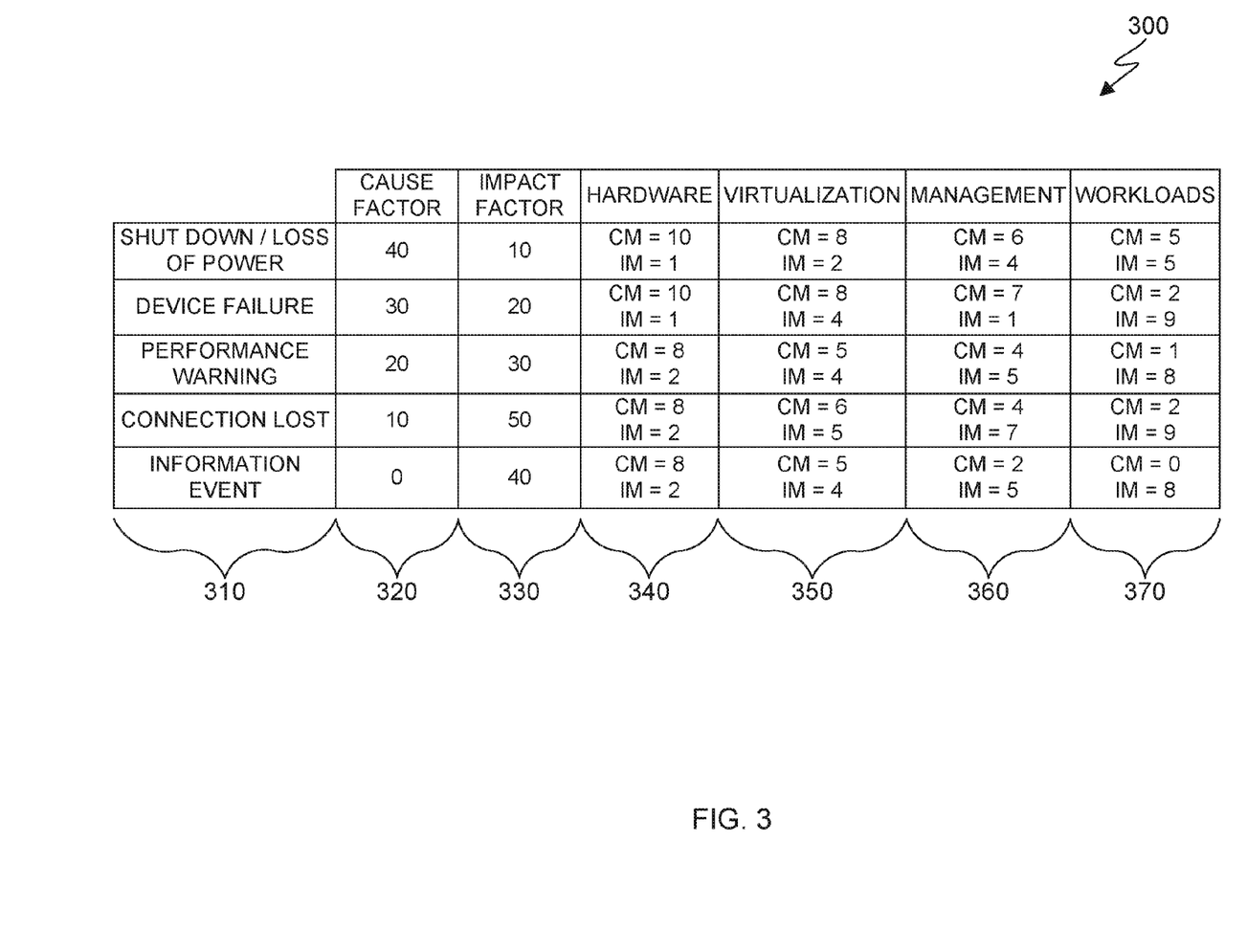
FIG. 3 is a table which illustrates the process of calculating the cause and impact weights for an event notification received from a sensor, in accordance with an embodiment of the invention.

The process of calculating the cause weight and impact weight for each event received from a sensor is depicted and described in greater detail with respect to FIG. 3.

In step 240, event management program 120 receives a selection of a desired metric from a user. In one embodiment, the metric selected is either the cause weight or the impact weight. In general, the desired metric is used to rank each of the event notifications in their order of relative importance, with respect to either the cause weight or impact weight associated with each event notification.

In step 250, event management program 120 ranks each of the event notifications based on either the cause weight or impact weight associated with each event notification, based on which metric was selected by a user in step 240. Event management program 120 may then use the ranked event notifications to generate an incident report. The incident report may, in some embodiments, include a maintenance ticket for an event notification based on a combination of the cause weight and/or impact weight, and scope ID information An example of event notifications sorted based on cause weight and presented to a user is provided and described in greater detail with respect to FIG. 5.

FIG. 3 is a table, generally designated 300, which illustrates an example of calculating the cause and impact weights for an event notification received from a sensor (e.g., any of sensors 142-168 of FIG. 1), in accordance with an embodiment of the invention.

In general, each row of table 300 represents information used to calculate the cause weight and impact weight for any event notification which is classified as being included within the generic event class corresponding to the row.

Column 310 depicts the different types of generic event classes into which an event notification can be classified, in accordance with an embodiment of the invention. In the depicted embodiment, column 310 includes only a set of example generic event classes related to a computing device, but in other embodiments, any other generic event classes which are applicable to a given embodiment can be included.

Column 320 depicts the cause factor for each generic event class. In general, the cause factor for an event notification is a value which is multiplied by a cause multiplier to determine the total cause weight for the event notification. In the depicted embodiment, the cause factor represents the likelihood that a given event indicated by an event notification is the cause of one or more other events (which may or may not be indicated by other event notifications). In one embodiment, the cause factor corresponding to each generic event class is entered by a user. In another embodiment, each of the generic event classes are ranked by a user, then event management program 120 assigns a cause factor to each generic event class based on its ranking.

Column 330 depicts the impact factor for each generic event class. As described above, the impact factor represents the relative chance of an event being the cause of other events, or impacting an end user, relative to other types of events.

Columns 340-370 depict the cause multipliers and impact multipliers (abbreviated in FIG. 3 as "CM" and "IM" respectively) which are used to calculate the cause weight and impact weight for each event notification received by event management program 120 based on the generic event class (the row of table 300) and the level of the OSI stack from which the event notification originates.

In general, the cause weight and impact weight for an event notification are calculated by first determining the cause factor and impact factor based on the generic event class of the event notification, then multiplying the cause factor and impact factor by the cause multiplier and impact multiplier respectively. In one example, an event notification which corresponds to a device failure within the virtualization layer of the OSI stack is received by event management program 120. Further, the cause factor is determined to be 30 and the impact factor is determined to be 20 based on the values included in columns 320 and 330 respectively. Because the event notification originated in the virtualization layer, the cause multiplier and impact multiplier contained in column 350 are utilized to calculate the cause weight and impact weight. In this example, the cause weight is determined to be 240 (30×8) and the impact weight is determined to be 80 (20×4).

Figure 4:
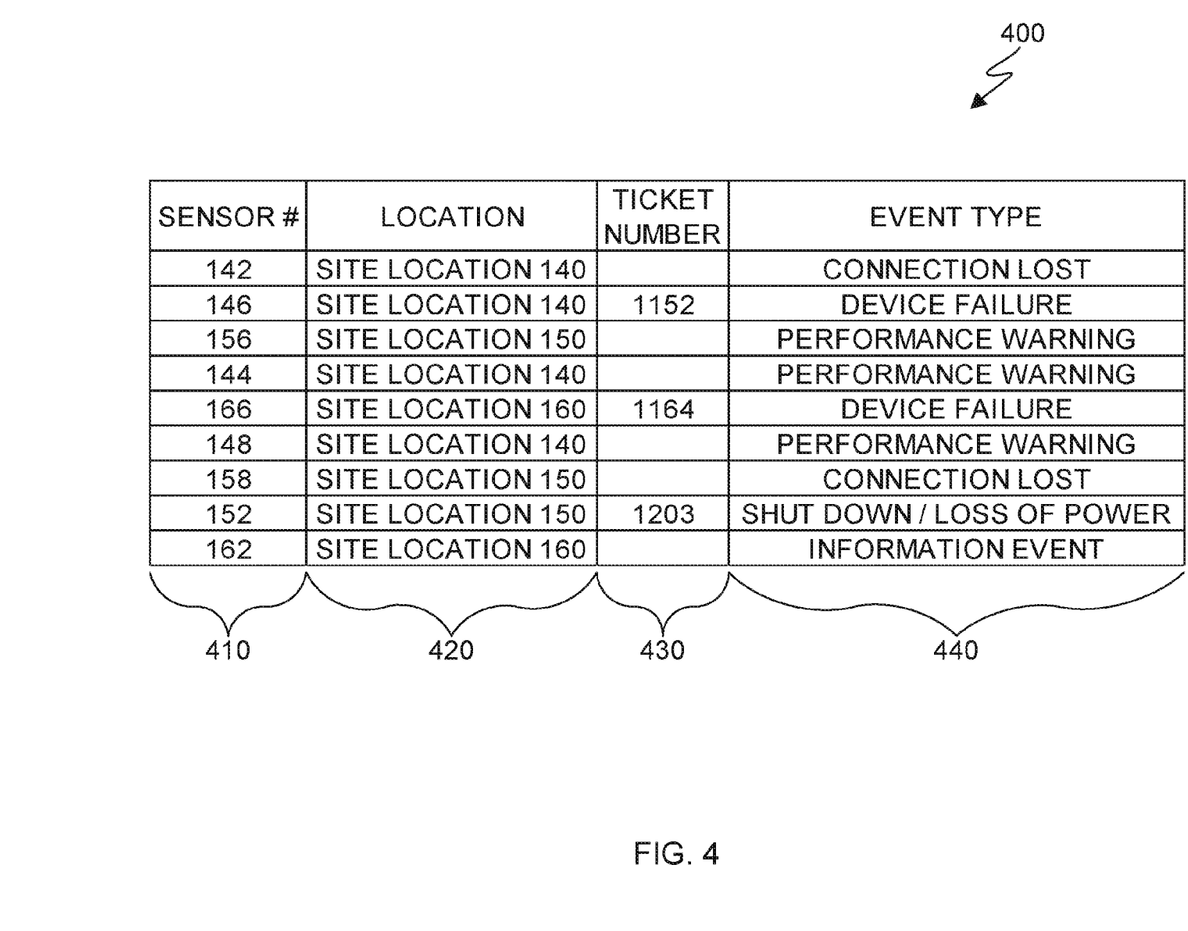
FIG. 4 is a table which illustrates an exemplary group of unfiltered event notifications as presented to a user, in accordance with an embodiment of the invention.

FIG. 4 is a table, generally designated 400, which illustrates an example group of unfiltered event notifications as presented to a user, in accordance with an embodiment of the invention. In the depicted embodiment, table 400 includes nine event notifications, each of which originates from a sensor within networked monitoring environment 100. Table 400 includes columns 410, 420, 430, and 440.

In general, each row of table 400 includes information related to one event notification received by event management program 120. Further, the nine rows of content included within table 400 indicate that nine event notifications were received by event management program 120 in the embodiment depicted in FIG. 4.

In the depicted embodiment, column 410 identifies the ID number of the sensor from which the event notification originates. In one embodiment, the ID number of a sensor is a unique identifier that is used by event management program 120 to distinguish between different sensors.

In the depicted embodiment, column 420 identifies the physical location within networked monitoring environment 100 from which the event notification originates. In the depicted embodiment, the physical location from which the event notification originates is the site location within networked monitoring environment 100 which includes the sensor which created the event notification.

In other embodiments, column 420 indicates the location at which event management program 120 received the event notification from a sensor. In still other embodiments, an additional column (not shown) may be added that indicates the time at which event management program 120 received the event notification from a sensor.

In the depicted embodiment, column 430 identifies whether or not a ticket is currently assigned to an event notification. In one embodiment, an operator assigns a ticket to an event that the operator determines to likely be the root cause of an issue, and does not assign a ticket to an issue which the operator determines is likely a result of another event.

In the depicted embodiment, column 440 identifies the generic event class of which the event notification represented by a given row is a member. In other embodiments, column 440 includes a brief text description which describes the type of event notification which corresponds to the row. In these embodiments, the text description can be either entered by an operator or received from a sensor.

Figure 5:
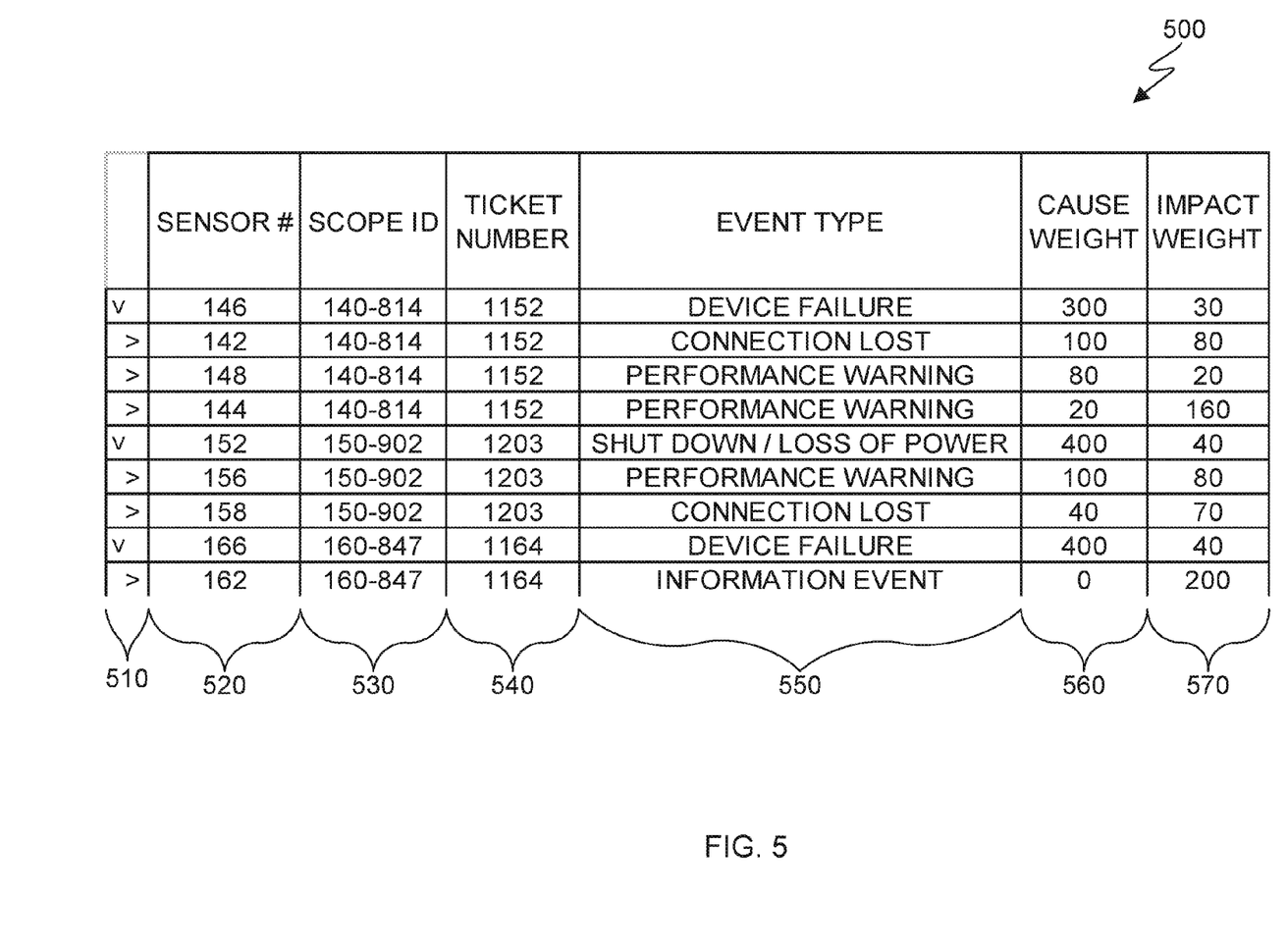
FIG. 5 is a table, generally designated 500, which illustrates an exemplary group of filtered, grouped, and sorted event notifications as presented to a user, in accordance with an embodiment of the invention.

In general, table 400 illustrates the way that event notifications are presented to an operator prior to accounting for cause and impact weights, and the amount of work required by an operator in comparison to the embodiment where event notifications are filtered, grouped, and sorted (see FIG. 5). It should be appreciated that the embodiment depicted in FIG. 4 illustrates only one embodiment of a ticket management system where an operator assigns a ticket to an event notification that the operator determines to be the most cause of a number of issues, and does not assign a ticket to other events which the operator determines are likely the result of another event notification.

FIG. 5 is a table, generally designated 500, which illustrates an exemplary group of filtered, grouped, and sorted event notifications as presented to a user, in accordance with an embodiment of the invention. In the depicted embodiment, table 500 includes nine event notifications, each of which originates from a sensor within networked monitoring environment 100. Table 500 includes columns 510, 520, 530, 540, 550, 560, and 570.

In general, each row of table 500 includes information related to one event notification received by event management program 120. Further, the nine rows of content included within table 500 indicate that nine event notifications were received by event management program 120 in the embodiment depicted in FIG. 5. Further, the nine event notifications included within table 500 are the same nine event notifications included within table 400 (see FIG. 4). The differences between table 400 and 500 are intended to illustrate the advantage provided by the filtering, grouping, and sorting applied to the event notifications included within table 500, in accordance with embodiments of the present invention.

In the depicted embodiment, column 510 includes a graphical element which indicates whether or not event management program 120 has determined that the event notification in a given row is likely the root cause of one or more issues which must be fixed, or is the result of another issue which must be fixed. In the depicted embodiment, a graphical element "v" indicates that event management program 120 has determined that the event notification represents the event that is most likely the cause of other events which occurred at the same physical location within the same time period. Further, a graphical element ">" indicates that event management program 120 has determined that the event notification represents an event that is likely the result of another event. It should be appreciated that the invention is not limited to the graphical elements depicted in FIG. 5, and the graphical elements included are intended to be illustrative and not limiting.

In the depicted embodiment, event management program 120 selects the event notification which is the most likely to be the cause of other event notifications based on the cause weight calculated for each event notification. In this embodiment, the event notification which has the highest calculated cause weight is selected as the most likely to be the cause of other event notifications.

In another embodiment, event notifications within the same scope ID are sorted based on the impact weight calculated for each event notification. Operatives monitoring for end user impact or taking calls from customers may find such an arrangement a more useful listing.

In the depicted embodiment, column 520 identifies the identification (ID) number of the sensor from which the event notification originates.

In the depicted embodiment, column 530 identifies the scope identification (ID) associated with each event notification received by event management program 120, in accordance with an embodiment of the invention. In various embodiments, the scope ID is an indicator which represents how far the impact of an alarm or event may be felt. In some embodiments, this is limited to a physical location, a network link and the locations at either end, a geographic region, or may cover non-physical attributes such as an alarm class or an ad-hoc grouping of devices. Embodiments of the present invention do not seek to limit the definition of scope ID, accepting that it may vary for different monitored environments. Scope ID and the time of origin of the event notification are utilized to group event notifications into groups of events which are likely to share the same root cause based on the time and location of origin of the event notifications.

In a typical embodiment events are grouped by scope ID and by the occurrence of events within a time window. The start of the time window is set by the occurrence time of the first event to appear in the group and continues for a defined period or until a defined quiet period, during which no further events or alarms matching the scope ID are received has passed. It should be appreciated that the invention is not limited to any particular method of defining the scope ID of an event notification, and that any method of defining the physical location or time of origin of an event notification may be used in various embodiments.

In some embodiments, the scope ID may represent a location within a network such as subnetwork from which an event notification originates. In these embodiments, components which are located within the same network, even if physically on the other side of the world, can be included in the same scope ID. For example, in an embodiment a large network company operates two networks, one of which transports video information while the other transports numerical information. In this embodiment, an event which occurs within the network which transports video information is within the same scope as an event which occurs within the same network at the same time, even if the second event occurs on the other side of the world.

In some embodiments it may prove necessary to alias scope IDs. For example one monitoring system may scope the application and database servers serving a particular web service with one scope ID, while another monitoring system scopes the routers and network links supporting the same web service with a different scope ID. In that embodiment it may be necessary for a master monitoring system to be able to alias the scope IDs in order to group all the events properly In the depicted embodiment, column 540 identifies whether or not a ticket is currently assigned to an event notification. In one embodiment, an operator assigns a ticket to an event that the operator determines is likely to be the root cause of an issue, and does not assign a ticket to an issue which the operator determines is likely a result of another event. In another embodiment, as shown, event management program 120 assigns a single ticket to all of the event notifications which occur within the same scope ID.

In the depicted embodiment, column 550 identifies the generic event class of which the event notification represented by a given row is a member. In other embodiments, column 550 includes a brief text description which describes the type of event notification which corresponds to the row. In these embodiments, the text description can be either entered by an operator or received from a sensor.

In the depicted embodiment, columns 560 and 570 identify the cause and impact weights for each event notification. In the depicted embodiment, the cause and impact weights in columns 560 and 570 are included to illustrate that event notifications which share the same scope ID are sorted in order of descending cause weight.

In other embodiments, any other information related to an event notification can be included in table 500. It should be appreciated that the set of information included in table 500 is meant to serve as an example of which information may be included in table 500 in one embodiment, and is not intended to be limiting.

Figure 6:
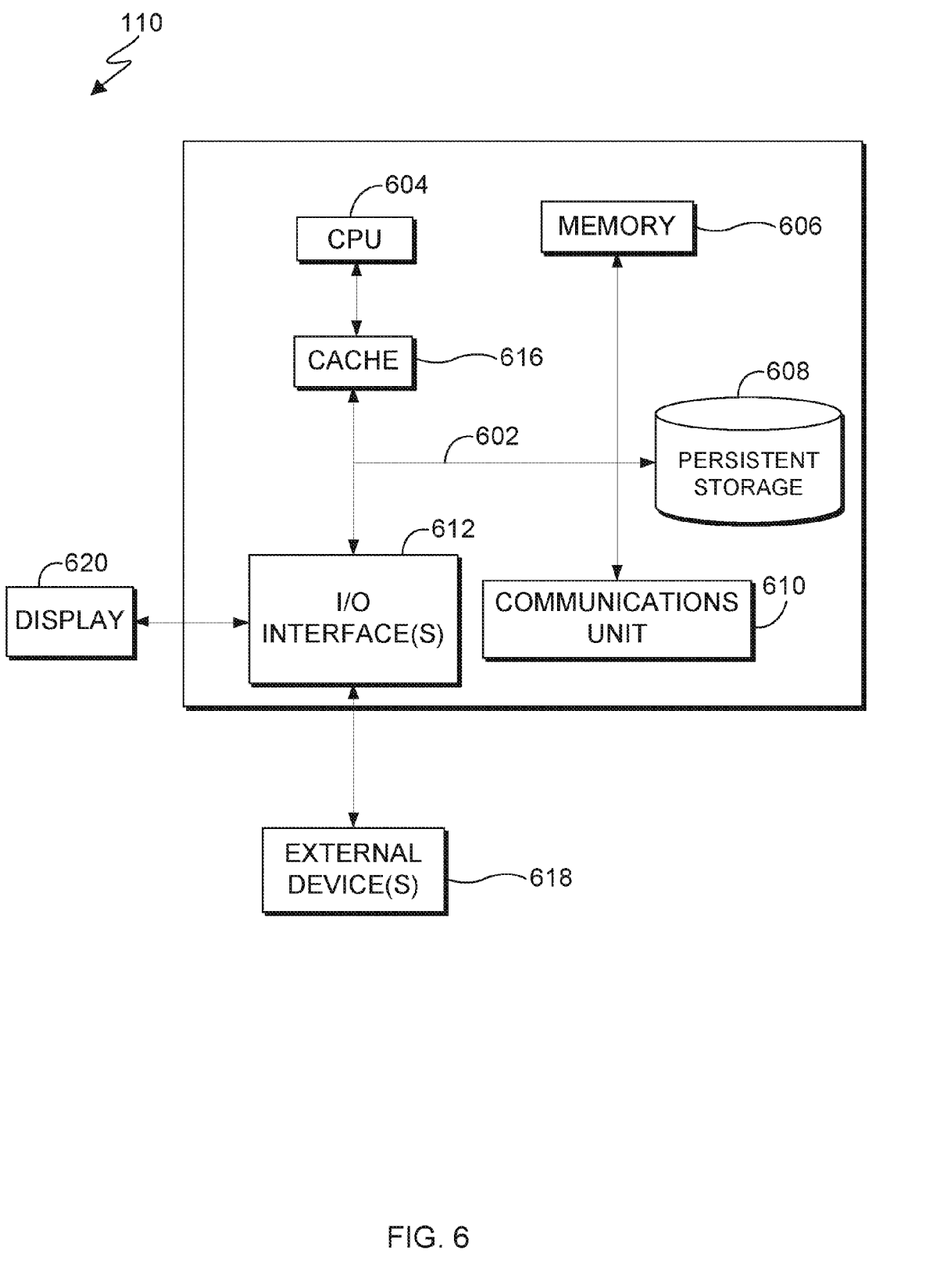
FIG. 6 is a block diagram illustrating the hardware components included in the computing device of FIG. 1 executing the event management program, in accordance with an embodiment of the invention.

FIG. 6 depicts the components of computing device 110, which is an example of a computing device that includes event management program 120 of embodiments of the present invention. Computing device 110 includes communications fabric 602, which provides communications between CPU 604, memory 606, persistent storage 608, communications unit 610, input/output (I/O) interface(s) 612, and cache 616. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data and data near accessed data from memory 606.

Program instructions and data used to practice embodiments of the present invention may be stored in persistent storage 608 for execution by one or more of the respective CPU(s) 604 via cache 616 and one or more memories of memory 606. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for identifying a first incident requiring action, the method comprising:
   receiving a notification from a sensor, wherein the notification is related to a problem identified by the sensor;
   determining, by one or more processors, an event type corresponding to the notification based on a capability of the sensor;
   creating, by one or more processors, a group of notifications based on information indicating a location from which each respective notification originated, wherein the group of notifications includes the notification;
   calculating, by one or more processors, a cause weight and an impact weight for each notification of the group of notifications based on, at least, the corresponding event type, a cause factor and an impact factor; and
   identifying, by one or more processors, the notification within the group of notifications based on the notification having a higher cause weight and impact weight than other notifications of the group of notifications, for assigning a maintenance ticket.

2. The method of claim 1, further comprising:
   determining, by one or more processors, a layer of a hierarchy from which the notifications originates; and
   wherein calculating the cause weight and the impact weight for each notification of the group of notifications is further based on the layer of the hierarchy corresponding to each respective notification of the group of notifications.

3. The method of claim 2, wherein the standard hierarchy is an Open Systems Interconnection (OSI) stack.

4. The method of claim 2, wherein the layer is selected from the group consisting of:
   physical layer, data-link layer, network layer, transport layer, session layer, presentation layer, and application layer.

5. The method of claim 1, wherein the event type is selected from the group consisting of: a physical shutdown, a loss of power, a component failure, a performance warning, an operational status notification, and an informational event.

6. The method of claim 1, wherein the impact weight indicates a likelihood to impact an end user.

7. The method of claim 1, wherein creating the group of notifications is further based on information indicating a time period during which each respective notification originated.

8. The method of claim 1, wherein the cause weight indicates a likelihood to cause other notifications.

9. A computer program product for identifying a first incident requiring action, the computer program product comprising:
one or more computer readable storage media and program instructions stored on the one or more computer readable storage media, the program instructions comprising:
program instructions to receive a notification from a sensor, wherein the notification is related to a problem identified by the sensor;
program instructions to determine an event type corresponding to the notification based on a capability of the sensor;
program instructions to create a group of notifications based on information indicating a location from which each respective notification originated, wherein the group of notifications includes the notification;
program instructions to calculate a cause weight and an impact weight for each notification of the group of notifications based on, at least, the corresponding event type, a cause factor and an impact factor; and
program instructions to identify the notification within the group of notifications based on the notification having a higher cause weight and impact weight than other notifications of the group of notifications, for assigning a maintenance ticket.

10. The computer program product of claim 9, further comprising:
program instructions, stored on the one or more computer readable storage media, to determine a layer of a hierarchy from which the notifications originates; and
wherein program instructions to calculate the cause weight and the impact weight for each notification of the group of notifications is further based on the layer of the hierarchy corresponding to each respective notification of the group of notifications.

11. The computer program product of claim 10, wherein the standard hierarchy is an Open Systems Interconnection (OSI) stack.

12. The computer program product of claim 10, wherein the layer is selected from the group consisting of: physical layer, data-link layer, network layer, transport layer, session layer, presentation layer, and application layer.

13. The computer program product of claim 9, wherein the event type is selected from the group consisting of: a physical shutdown, a loss of power, a component failure, a performance warning, an operational status notification, and an informational event.

14. The computer program product of claim 9, wherein the impact weight indicates a likelihood to impact an end user.

15. The computer program product of claim 9, wherein program instructions to create the group of notifications is further based on information indicating a time period during which each respective notification originated.

16. The computer program product of claim 9, wherein the cause weight indicates a likelihood to cause other notifications.

17. A computer system for identifying a first incident requiring action, the computer system comprising:
one or more computer processors, one or more computer readable storage media, and program instructions stored on the one or more computer readable storage media for execution by at least one of the one or more processors, the program instructions comprising:
program instructions to receive a notification from a sensor, wherein the notification is related to a problem identified by the sensor;
program instructions to determine an event type corresponding to the notification based on a capability of the sensor;
program instructions to create a group of notifications based on information indicating a location from which each respective notification originated, wherein the group of notifications includes the notification;
program instructions to calculate a cause weight and an impact weight for each notification of the group of notifications based on, at least, the corresponding event type, a cause factor and an impact factor; and
program instructions to identify the notification within the group of notifications based on the notification having a higher cause weight and impact weight than other notifications of the group of notifications, for assigning a maintenance ticket.

18. The computer system of claim 17, further comprising:
program instructions, stored on the one or more computer readable storage media for execution by at least one of the one or more processors, to determine a layer of a hierarchy from which the notifications originates; and
wherein program instructions to calculate the cause weight and the impact weight for each notification of the group of notifications is further based on the layer of the hierarchy corresponding to each respective notification of the group of notifications.

19. The computer system of claim 18, wherein the standard hierarchy is an Open Systems Interconnection (OSI) stack.

20. The computer system of claim 18, wherein the layer is selected from the group consisting of: physical layer, data-link layer, network layer, transport layer, session layer, presentation layer, and application layer.

* * * * *